United States Patent
Fedi et al.

[15] 3,682,208
[45] Aug. 8, 1972

[54] SAFETY DEVICE FOR INTERLOCKING SEALED ENCLOSURES

[72] Inventors: Leto Fedi, L'Etang-la-Ville; Jean Meunier; Jean Vertut, both of Paris, all of France

[73] Assignee: Commissariat A L'Energie Atomique, Paris, France

[22] Filed: March 27, 1970

[21] Appl. No.: 23,342

[30] Foreign Application Priority Data

April 4, 1969 France......................6910571

[52] U.S. Cl. ....................141/384, 49/114, 49/279, 220/29, 285/84
[51] Int. Cl. ...............................................E05c 7/06
[58] Field of Search................49/109, 114, 279, 300; 141/346–349, 383, 384; 220/29; 285/84, 91; 176/30–32

[56] References Cited

FOREIGN PATENTS OR APPLICATIONS 77,258  1/1962  France..........................176/30

OTHER PUBLICATIONS

German Printed Application 1,017,454 10– 1957 Luther

*Primary Examiner*—Edward J. Earls
*Attorney*—Craig, Antonelli and Hill

[57] ABSTRACT

A safety device for an interlocking mechanism which permits leak-tight transfer between two sealed enclosures and which comprises a movable outer ring for applying the enclosure flanges against each other, a locking ring for interlocking the two enclosure doors, an extracting ring for releasing and opening both doors. The movable outer ring and locking ring each have a toothed sector engaged with a pinion and rotatable by means of a removable crank. The safety device comprises two shield plates for preventing removal of the crank at any time except at the beginning and end of travel of the toothed sector, a first locking member which prevents any displacement of the locking ring when the outer ring is not in the closed position, a second locking member which prevents the closure of the outer ring when the second enclosure is not present and a third locking member which prevents any rotational motion of the extracting ring when the two doors are not locked one against the other.

12 Claims, 6 Drawing Figures

SAFETY DEVICE FOR INTERLOCKING SEALED ENCLOSURES

This invention relates to a safety device for the different connecting and opening means in an interlocking mechanism which provides a joint between two leak-tight enclosures. In the case of each enclosure, the joint is constituted by a flange and a door which defines an opening having the same diameter, the two flanges as well as the the two doors being brought into contact at the time of joining together. The assembly consisting of the two juxtaposed and interlocked doors can be opened, thus providing a passageway for effecting transfer between the two enclosures. In particular, one of said enclosures can be a cell for handling hazardous products and associated with nuclear installations, for example, and the other enclosure can be a leak-tight container which can be adapted to the first cell or any similar cell.

More specifically, the present invention relates to a safety device in systems for locking and opening the leak-tight joint between two juxtaposed and interlocked enclosures, the joint being constituted in the case of each enclosure by a flange and a door, provision being made in said systems for a first-enclosure flange comprising a movable outer ring which locks the second enclosure to the first so that the flanges are applied against each other, a movable inner ring or so-called locking ring which is driven in rotation so as to cause the locking of said two doors one against the other and unlocking of the door of the second enclosure with respect to said enclosure and an extracting ring which is rotatable with respect to the locking ring so as to release both doors. The safety device essentially comprises two shield plates and one plate is rigidly fixed to the flange of the first enclosure, a first locking member which prevents any displacement of the locking ring when the outer ring is not in the closed position, a second locking member which prevents the closure of the outer ring when the second enclosure is not present and a third locking member which prevents any rotational motion of the extracting ring when the two doors are not locked one against the other.

A first advantageous embodiment corresponds to the case in which the locking ring is rotationally displaced by a lever and adapted to carry a lever-actuated bolt which serves to lock said ring against the flange of the first enclosure, said locking ring being provided with grooves for the rotational displacement of the door of the first enclosure which is fitted with latch-pins and also to the case in which the extracting ring is rotationally displaced by a lever and adapted to carry a lever-actuated bolt which locks said extracting ring to the locking ring, said extracting ring being provided with guide ramps for receiving said latch-pins of the door of the first enclosure. Said safety device essentially comprises a plate which is rigidly fixed to the extracting ring and adapted to cover a sector at least equal to the travel of said extracting ring with respect to the locking ring and against which is abuttingly applied the lever for effecting rotation and/or positional locking of the locking ring in any positions other than those corresponding to the door which is fully applied against the cell flange. Essentially, said device further comprises a second plate which is rigidly fixed to the cell flange and adapted to cover a sector at least equal to the range of travel of the locking ring and against which is abuttingly applied the lever for effecting rotation and/or positional locking of the extracting ring in any positions other than the position in which the two juxtaposed doors are interlocked and a rod located between the outer locking ring and the inner locking ring, said rod being adapted to pass right through the flange in leak-tight manner and having a length which is greater than the flange thickness through which said rod passes, said rings being each provided respectively with a frusto-conical recess for receiving the extremity of the rod; said recesses being all located opposite to said rod when said rings are in the locked positions.

A second advantageous embodiment corresponds to the case in which the outer movable ring is provided on the external periphery thereof with a portion constituting a first toothed sector in meshing engagement with a first pinion having a shaft which is rigidly fixed to the wall of the first enclosure and rotatable by means of a removable crank. In this embodiment, the locking ring is set in rotation under the action of the movement of rotation imparted to the outer ring by means of said removable crank, said locking ring being provided on the one hand over a portion of its external periphery with a second toothed sector in meshing engagement with a second pinion having a shaft which is rigidly fixed to the outer ring and rotatable by means of said removable crank and on the other hand with guide ramps against which are applied latch-pins rigidly fixed to the door of the first enclosure, said guide ramps being released from said latch-pins under the action of the rotation imparted to the locking ring by said second pinion, thus having the effect of releasing the assembly consisting of both doors. Said safety device essentially comprises two shield plates : the first shield plate is rigidly fixed to the locking ring, is adapted to cover the first toothed sector and is provided with notches for mounting the removable crank on the actuating shaft of the first pinion and for removing said crank solely at the beginning and at the end of travel of the first toothed sector. The second shield plate is rigidly fixed to the wall of the first enclosure and has a shape such that said plate covers the actuating shaft of the second pinion when the first toothed sector is at the beginning of travel and frees said actuating shaft when the first sector has reached the end of travel, the assembly being such as to make it impossible at any moment to free the removable crank from one of the two pinions in order to mount said crank on the actuating shaft of the other pinion.

Further properties and advantages of the invention will become apparent from the following description, reference being had to the accompanying figures in which two embodiments of the invention are given by way of explanation but not in any limiting sense.

In these drawings:

FIG. 1 is a sectional view, with the door closed, of the device according to the invention in the case of direct control of all the interlocking rings by means of an operating lever;

FIG. 1A is a half partial cross-sectional schematic view taken along the line A-A of FIG. 1 showing the relationship between doors 3 and 18 and the enclosure 17.

Figure 1:
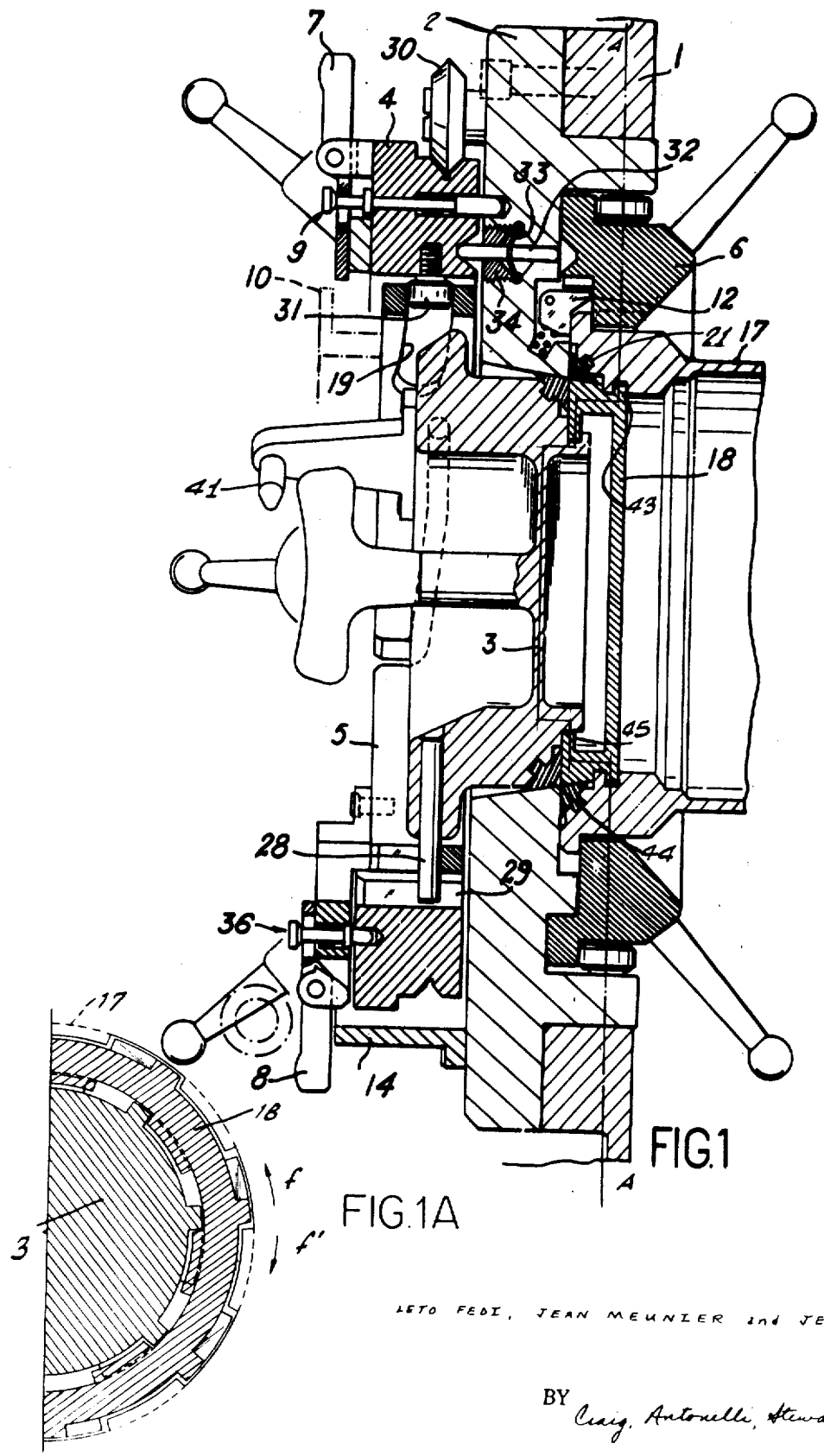

The interlocking system of known type which is illustrated in the different figures is intended on the one hand to permit the connection and locking of a leak-tight container (second enclosure) having a circular door to a leak-tight cell (first enclosure) having a flange and a door. Said cell is intended to be employed for such purposes as the handling of hazardous materials or for providing insulation from the exterior in the case of materials which are sensitive to external conditions. The complete assembly is intended to permit on the one hand the interlocking of the two enclosures and the juxtaposition of the two doors which are opened on completion of the interlocking operation. Opening of the joint which is thus formed permits the transfer of objects from one enclosure into the other, the complete operation being carried out under conditions of constant imperviousness with respect to the exterior.

In the case of the first embodiment of the device according to the invention (shown in FIGS. 1 to 3), the wall 1 of the cell is adapted to carry a flange 2 which is fitted in particular with a seal and a fastening nut; said flange comprises, beginning at the exterior of the cell, an outer locking ring 6; said ring serves to lock the second enclosure or container 17 to the flange 2 by means of a movement of rotation. Seals 21 and 44 are provided to seal the connections between the doors on the respective enclosures. Within the interior of the cell, the flange 2 is fitted with an inner locking ring 4 which is guided by runner-wheels such as the wheel 30; an operating lever 7 serves to produce the rotation of the ring 4; said ring is in turn adapted to carry a second ring 5 or so-called extracting ring. An operating lever 8 which is similar to the lever 7 serves to actuate the extracting ring 5 and this latter is in turn guided within the interior of the ring 4 by means of runner-wheels such as the wheel 31.

The operation of the complete assembly shown in FIG. 1 is as follows: the container 17 is brought into position and locked by means of the ring 6; the doors 3 and 18 which are in oppositely facing relation are then interlocked by rotating the ring 4, thus producing the rotation of the door 3 by means of latch-pins 28 which are placed within the grooves 29, said door being maintained applied against the flange by means of the same pin 28 which is brought into contact with the extremity of the guide ramp 19. During a first part of this movement of rotation, namely of the order of 30 degrees, the door 3 is locked to the door 18 until the two doors are in relative abutment, then displaces the door 18 which rotates within the container 17 and is automatically released therefrom; withdrawal of the double door 3 — 18 is then carried out by rotating the extracting ring 5. See FIG. 1A for a schematic showing of the interlocking connection between doors 3 and 18 and the container 17. Both doors 3 and 18 will rotate as a unit if rotated in the direction of arrow $f$. After a predetermined rotation, door 18 will become locked to container 17. After a further predetermined rotation in the same direction $f$, door 18 becomes released from door 3. By rotating in the direction $f'$, the sequence is reversed whereby doors 3 and 18 are locked together and then released from container 17. Protrusions 43 on door 18 (See FIGS. 1 and 3) provide for the bayonet connection of door 18 to container 17, while protrusions 45 on door 18 (FIG. 1) provide for the bayonet connection of door 18 to door 3. The double door 3-18 can be pivoted away from the openings on hinges 22 which are hinged at 41 and 42. By means of the guide ramps 19, said ring 5 extracts the double door which is prevented from rotating by the pins 28 which are engaged within the grooves 29 of the locking flange which remains stationary. Especially in the case in which it is necessary to provide protection against the toxic nature of products contained within the enclosure and within the container, it is obviously very important to prevent any mishandling during all the operations hereinabove described which must be carried out only in a predetermined sequence. Safety systems which are already known call for data-processing and electric prohibition interlocks which are grouped together in a control desk but these devices have the disadvantages of being highly complex.

The present invention relates to a completely mechanical device. This device comprises a set of locking members and shields; a locking member 9 serves to secure the ring 4 with respect to the flange 2 in which blind-end bores are formed opposite to the positions occupied by said member 9 when the ring 4 is in the open position and closed position, the effect of closure of the ring being to lock the doors 3 and 18 one against the other. In the case under consideration, the operating lever 7 is intended to displace the lock-bolt 9 and to release this latter as a result of a pivotal movement which takes place in a plane which passes through the general axis of the joint. At the same time, the operating lever causes the rotation of the locking ring 4 by means of a general radial movement. A shield plate 10 which is rigidly fixed to the extracting ring 5 has the shape of a sector so that, in the position shown in FIG. 2, said plate permits the lifting movement of the extremity of the lever 7 (in position $7_2$ as shown in full lines) but that, in any other position such as $7_1$ up to the position of full withdrawal of the doors, said shield plate prevents the operating lever 7 from withdrawing the lock-bolt 9 from its recess. Moreover, depending on the position of the outer locking ring 6, a sliding latch-pin 32 as shown in FIG. 1 is either capable of or prevented from withdrawing from a frusto-conical bore formed in the ring 4. Said pin 32 terminates at both ends in a frusto-conical or rounded portion and traverses the flange 2, leak-tightness during the sliding motion of said pin being maintained by means of a diaphragm 33 which is applied by the nut 34. Recesses of either frusto-conical or rounded shape are formed respectively in the outer ring 6 and in the locking ring 4 so as to prevent the two rings 4 and 6 from rotating when one of these latter is not located in the closed position. In the position which is illustrated in FIGS. 1 to 3, it is clearly impossible to displace the ring 4 in spite of the frusto-conical shape of the recess since the sliding latch-pin 32 is applied positively against the ring 6; on the other hand, when the outer ring 6 is also in the closed position and by virtue of a suitable length of the latchopin, a small effort exerted on the locking ring 4 causes the latch-pin 32 to withdraw from its recess and lock the ring 6 in position.

Figure 2:
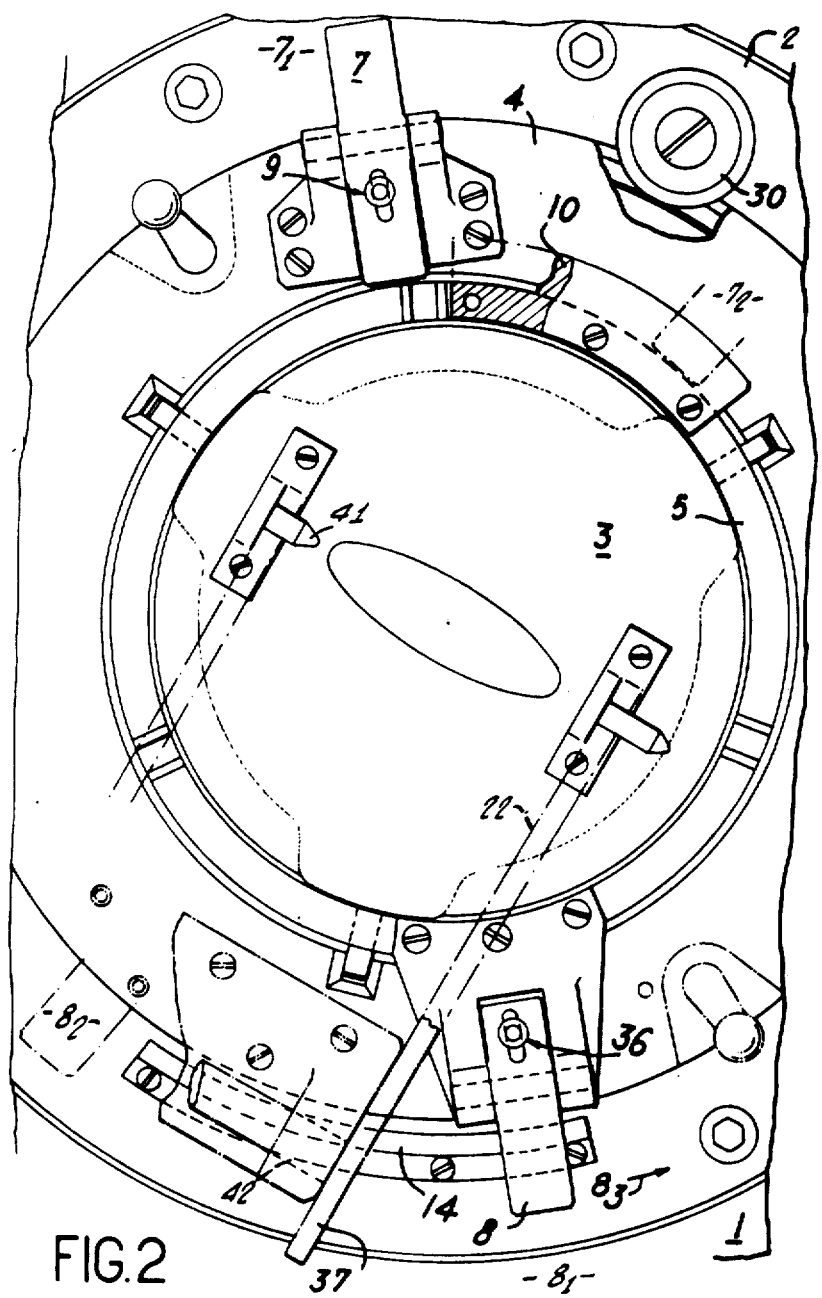
FIG. 2 is a top view of said device, this view being taken from the interior of the first enclosure.
Figure 3:
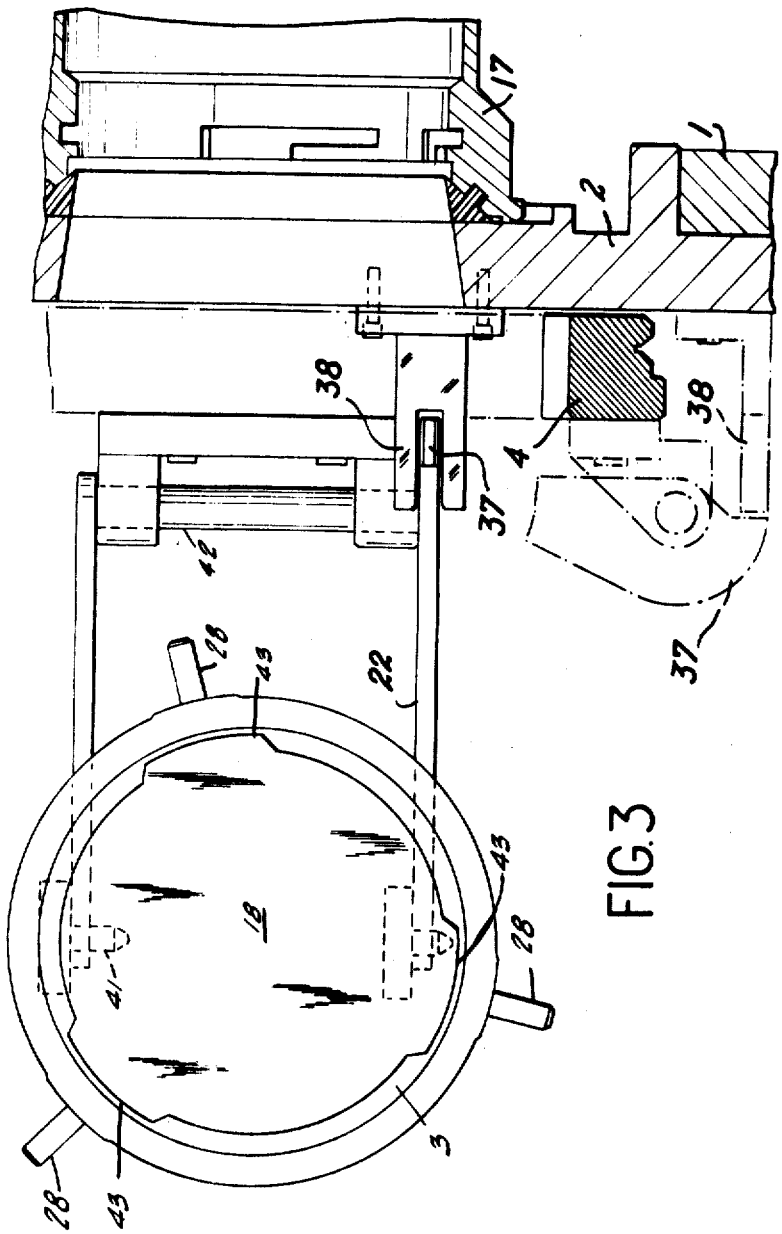
FIG. 3 is a partial view of FIG. 1, the door being in the open position.

As shown in FIG. 2, the extracting ring 5 comprises in the same manner as the locking ring 4 a locking device which is also actuated as a result of the pivotal motion of the lever 8 ; a second plate 14 which is attached to the flange 2 and located on a sector makes it impossible to release the lock-bolt 36 in any position of the extracting ring except when this latter is in the closed position with the door locked. It is then impossible to lower the lever 8 and to move the extracting ring 5. Under these conditions, the operation of the locking systems is as follows, starting from the position $7_1$, $8_1$ in which the door is applied within its flange. The ring 4 is open, the ring 5 is closed, each ring being positionally maintained by means of its locking member 9 or 36. It is thus impossible to release the lock-bolt 36 since the lever 8 in position $8_1$ abuts against the member 14, thereby preventing any possibility of unlocking of said bolt 36 and therefore also preventing any possibility of rotational movement. Moreover, it would be possible to actuate the lever 7 and to release the lock-bolt 9 but any rotation of the ring would be impossible since the sliding latch-pin 32 penetrates into the recess of the ring 4 and locks this latter in position. A container 17 can then be placed in position and, when the external locking ring 6 has been closed and the latch-pin 32 has been released, the movement of rotation of the locking ring 4 can be carried out by means of the lever 7 which has first been lowered. At the end of travel ($7_2$, $8_2$), the lock-bolt 9 automatically secures the ring 4 with respect to the flange 2 ; the lever 8 is then located in position $8_2$ at the extremity of the member 14 which made any movement of the ring 5 impossible ; it is therefore possible to withdraw the bolt 36 by depressing the lever 8 and carrying out the movement of rotation, thus withdrawing the double door from the flange. As soon as this movement of rotation has begun, the plate 10 prevents any movement of the operating lever 7 and therefore of the locking ring 4 ; it should be noted that, if the operator should inadvertently depress the lever 7, thus releasing its lock-bolt 9, the lever 7 will come into abutment against the plate 10, thus preventing any withdrawal of the doors. In this position, it is impossible to displace the external locking ring 6 which is positionally maintained by the extremity of the latchpin 32 as this latter engages in a frusto-conical recess formed in said ring ; it is therefore impossible to remove the container while the door is open.

In the system hereinabove described, there nevertheless remains one possibility of maloperation which would consist of actuating the extracting ring 5 without first having replaced the double door in position. In order to guard against such a major error and in accordance with an advantageous embodiment, the heel 37 of the hinge 22 which holds the double door is adapted to engage in a yoke 38 which is carried by the flange 2.

Another possible error of operation would consist in closing the outer ring 6 when no container is present ; in this case, everything would take place as if a container were in position and the pin 32 would release the locking flange. In order to remove this danger, a catch 12 is adapted to arrest the movement of the outer ring 6 when there is no container. The same system could also be employed for the purpose of securing the extracting ring 5 when no door is in position.

Figure 4:
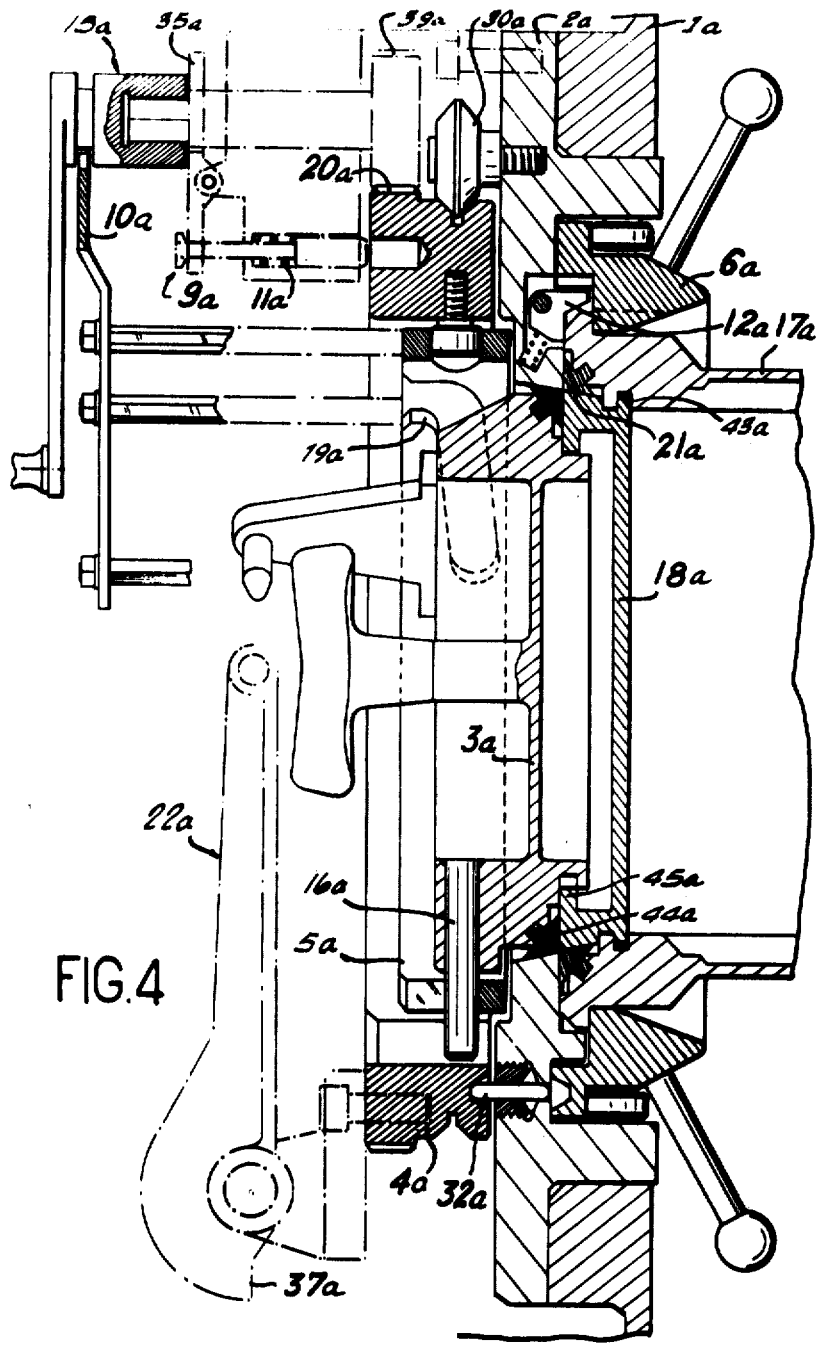
FIG. 4 is a sectional view, with the door closed of another embodiment of the device according to the invention which corresponds to the case in which the locking and extracting rings are operated by means of pinions and cranks.
Figure 5:
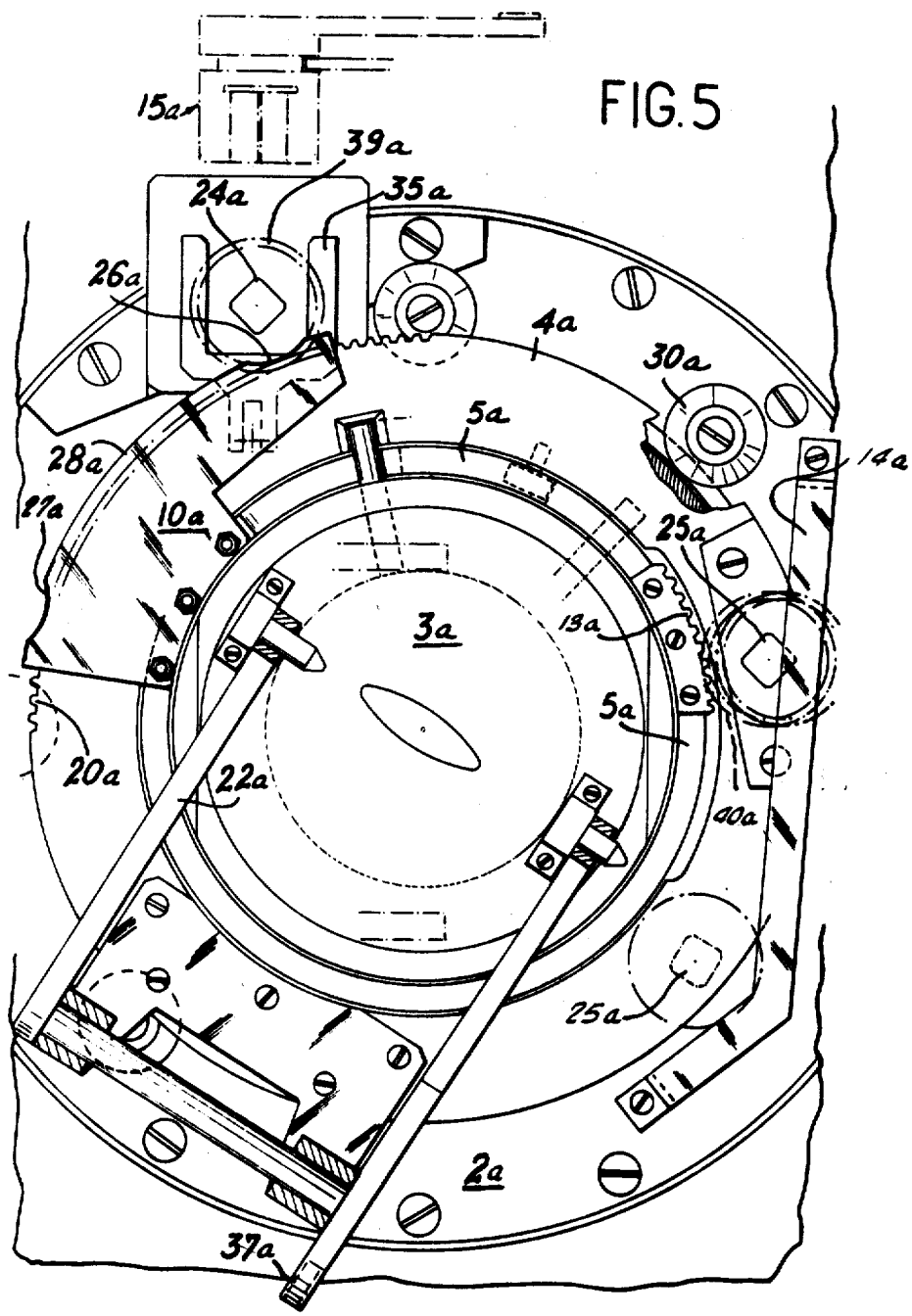
FIG. 5 is a top view of the device of FIG. 4, this view being taken from the interior of the first enclosure.

FIGS. 4 and 5 show another embodiment of the device according to the invention which corresponds to the case in which the locking and extracting rings are actuated by means of pinions and cranks. All reference numerals in these figures include the suffix a, however it is noted that many of the parts of this embodiment are identical with correspondingly numbered parts in the embodiment of FIGS. 1—3.

An arrangement of this kind is made necessary when the doors are of large diameter and consequently entail high friction torque in order to permit their rotation. A single crank 15a serves to actuate the locking ring and the extracting ring in turn ; by means of a pinion 39a, the shaft of which is rigidly fixed to the flange and which is adapted to cooperate with a toothed sector 20a formed on the ring 4a, motion is thus transmitted to said ring ; by placing the crank on its square, the lever 35a is caused to carry out a pivotal movement, thereby releasing the lock-bolt 9a. In this embodiment, the plate 10a covers the toothed sector 20a of the locking ring and is provided with notches 26a and 27a which make it possible to mount the crank 15a on the pinion actuating shaft 24a and to remove the crank only at the beginning and end of travel. Similarly, the plate 14a which is rigidly fixed to the flange has a shape such as to prevent the crank from being placed in any position except for that position in which the locking flange is closed.

Under these conditions, the operation of the safety device in accordance with the invention is as follows : when a container has been placed in position, the door of the cells is closed and applied against its flange ; by means of the notch 26a, the plate 10a makes it possible to place the crank 15a on the drive shaft 24a of the pinion 39a; at this stage it would be impossible to place the crank on the drive shaft 25a of the pinion 40a which is covered by the plate 14a. The locking ring 4a is actuated by the crank 15a. At the end of the locking operation, the crank can be disengaged, which is impossible between the two positions by reason of the profile of the plate 10a. The crank can then be placed on the drive shaft 25a kof the pinion 40a which actuates the extracting ring ; it should be noted at this point that, as a result of the displacement of the ring 5a, the plate will prevent any possibility of placing a second crank on the square 24 which serves to actuate the locking system.

What we claim is :

1. A safety device for use in systems for locking and opening a leak-tight joint between two juxtaposed and interlocked enclosures, the joint being constituted in the case of each enclosure by a flange and a door, provision being made in said systems for a first-enclosure flange comprising a movable outer ring which locks the second enclosure to the first so that the flanges are applied against each other, a movable inner locking ring which is driven in rotation so as to cause the locking of said two doors one against the other and subsequent unlocking of the door of the second enclosure with respect to said second enclosure and an extracting ring which is rotatable with respect to the locking ring so as to release both doors so that they can be removed as a unit; said safety device comprising a first locking member for preventing any displacement of the locking ring when the outer ring is not in the closed position, a second locking member for preventing the closure of the outer ring when the second enclosure is not present, a third locking member for preventing any rotational motion of the extracting ring when the two doors are not locked one against the other, and shield plate means disposed on said system for preventing the inadvertent release of at least one of said locking members during the opening and closing of said system.

2. A safety device in accordance with claim 1 for use in systems in which the locking ring is rotationally displaced by a lever and adapted to carry a lever-actuated bolt which serves to lock said locking ring against the flange of the first enclosure, said locking ring being provided with grooves for the rotational displacement of the door of the first enclosure which is fitted with latch-pins, and for systems in which the extracting ring is rotationally displaced by a lever and adapted to carry a lever-actuated bolt which is part of said third locking member which locks said extracting ring to the locking ring, said extracting ring being provided with guide ramps for receiving said latch-pins of the door of the first enclosure; wherein said safety device further comprises a first plate which is part of said shield plate means, said first plate being rigidly fixed to the extracting ring and adapted to cover a sector at least equal to the travel of said extracting ring with respect to the locking ring and against which is abbutingly applied the lever for effecting rotation as well as positional locking of the locking ring in any positions other than those corresponding to the door which is fully applied against the first enclosure flange, a second plate which is part of said shield plate means, said second plate being rigidly fixed to the first enclosure flange and adapted to cover a sector at least equal to the range of travel of the locking ring and against which is abuttingly applied the lever for effecting rotation as well as positional locking of the extracting ring in any positions other than the position in which the two juxtaposed doors are interlocked, and a rod which is part of said first locking member, said rod being located between the outer locking ring and the inner locking ring, said rod being adapted to pass right through the flange in leak-tight manner and having a length which is greater than the flange thickness through which said rod passes, said rings being each provided respectively with a frustoconical recess for receiving the extremity of the rod, said recesses being all located opposite to said rod when said rings are in the locked position.

3. A safety device in accordance with claim 1 for use in systems in which the outer movable ring is provided on the external periphery thereof with a portion constituting a first toothed sector in meshing engagement with a first pinion having a shaft which is rigidly fixed to the wall of the first enclosure and rotatable by means of a removable crank, in which the locking ring is set in rotation under the action of the movement of rotation imparted to the outer ring by means of said removable crank and is provided on the one hand over a portion of its external periphery with a second toothed section in meshing engagement with a second pinion having a shaft which is rigidly fixed to the outer ring and rotatable by means of said removable crank and on the other hand with guide ramps against which are applied latch-pins rigidly fixed to the door of the first enclosure, said guide ramps being released from said latch-pins under the action of the rotation imparted to the locking ring by said second pinion and thus having the effect of releasing the assembly consisting of both doors, wherein said safety device further comprises first and second shield plates constituting portions of said shield plate means, said first plate being rigidly fixed to the locking ring and adapted to cover the first toothed section and being provided with notches for mounting the removable crank on the actuating shaft of the first pinion and for removing said crank solely at the beginning and at the end of travel of the first toothed sector, said second plate being rigidly fixed to the wall of the first enclosure and having a shape such that said second plate covers the actuating shaft of the second pinion when the first toothed sector is at the beginning of travel and frees said actuating shaft when the first sector has reached the end of travel, said shield plate means including further means for making it impossible at any moment to free the removable crank from one of the two pinions in order to mount said crank on the actuating shaft of the other pinion.

4. An arrangement for locking together two sealed enclosures and for subsequently opening the enclosures to one another while maintaining the combination of the two sealed enclosures in sealed relationship with respect to the exterior thereof, said arrangement comprising a first rotatable member defining a door for closing a first enclosure, a second rotatable member defining a door for closing a second enclosure, a third rotatable member defining an outer locking ring for locking said first enclosure to said second enclosure, a fourth rotatable member defining an inner locking ring for locking said first member to said second member upon a first rotation of said fourth member through a predetermined angle and for unlocking said first member from said first enclosure upon a second further rotation of said connected first and fourth members through a predetermined further angle, a fifth rotatable member defining an extracting ring for releasing the connected first and second members from the fourth member so that they can be moved to permit communication between the two enclosures, releasable locking means for rotatably locking together at least two of the above mentioned rotatable members, and shield plate means for preventing the release of said locking means in dependence on the relative rotative position of at least one member other than the two rotatably locked members.

5. An arrangement according to claim 4, characterized in that said locking means includes pin means mounted on one of the two members to be locked together, said pin means being selectively slidable into engagement with aperture means on the other of the members to be locked together, said pin means having lever means pivotally connected to said pin means for manually releasing said pin means from said aperture means, said shield plate means including arcuate plate means mounted on means other than one of said rotatable members being rotatably locked by said pin means, said arcuate plate means being disposed adjacent said lever means for preventing the operation of said lever means when said rotatable members are in certain predetermined rotative positions with respect to one another.

6. An arrangement according to claim 5, characterized in that said pin means includes a pin mounted on said fifth member for locking said fifth member to said fourth member and said arcuate plate means includes plate means mounted on a flange fixed to said first enclosure.

7. An arrangement according to claim 6, characterized in that said locking means includes further pin means slidably disposed in the flange fixed to the first enclosure, said further pin means being selectively engageable with either said third member or with said fourth member in dependence on the rotative position of said fourth member and in dependence on whether said second enclosure is connected.

8. An arrangement according to claim 7, further comprising catch means mounted on the fixed flange of said first enclosure for preventing the rotation of said third member in the absence of the second enclosure.

9. An arrangement according to claim 5, further comprising pivotal hinge means attached to the inside surface of said first rotatable member for pivotably moving said first member and attached second member so as to permit communication between the enclosures, characterized in that said hinge means includes heel means operatively connected with said fifth member for preventing the inadvertent rotation of said fifth member when the enclosures are in communication with one another.

10. An arrangement according to claim 5, further comprising catch means mounted on the fixed flange of said first enclosure for preventing the rotation of said third member in the absence of the second enclosure.

11. An arrangement according to claim 4, characterized in that said fourth and fifth members are selectively rotatable by respective pinion means engaging with respective toothed portions at their peripheries, said pinion means each including shaft means for selective engagement with a hand crank, said shield plate means including arcuate plate means selectively positioned over said shaft means in response to predetermined rotative positions of said members whereby the rotation of the respective fourth or fifth members is precluded.

12. An arrangement according to claim 11, characterized in that said arcuate plate means include annular abutment means for precluding the removal of said hand crank except at predetermined positions of the member being rotated.

* * * * *